Feb. 10, 1942. H. L. DENNIS 2,272,636
LUBRICATING ATTACHMENT
Filed May 28, 1940
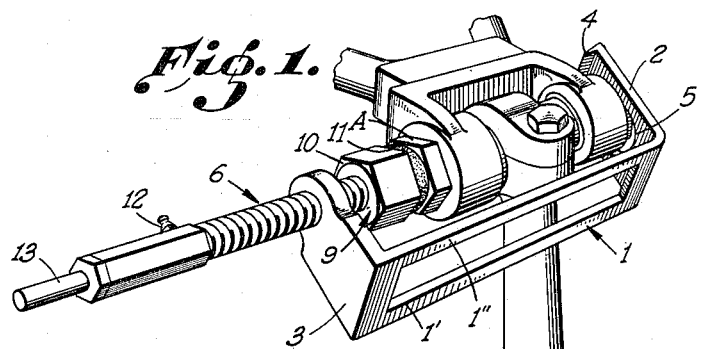
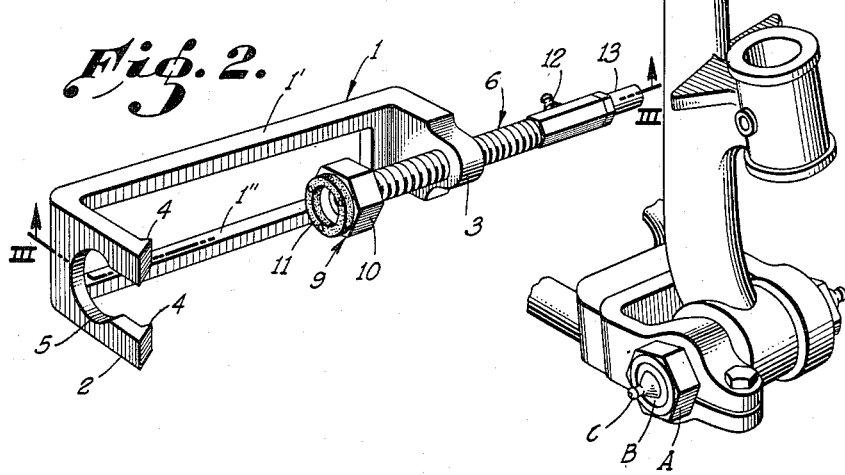
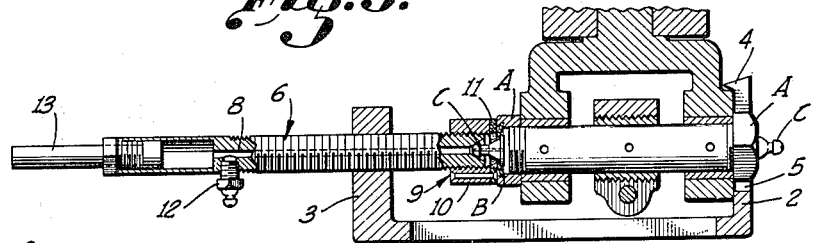
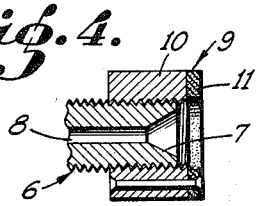
HARPER LINDSAY DENNIS
INVENTOR
BY
ATTORNEY Patented Feb. 10, 1942

2,272,636

UNITED STATES PATENT OFFICE 2,272,636

LUBRICATING ATTACHMENT

Harper Lindsay Dennis, Pasadena, Calif.

Application May 28, 1940, Serial No. 337,602

8 Claims. (Cl. 221—47.4)

This invention relates to a device for use in lubrication through high pressure grease fittings and the like.

In lubricating bearings with high pressure grease guns, difficulty is often experienced because of dirt and hardened grease having accumulated in the bearing, the lubrication channels, or in the fitting through which grease is forced to the bearing surfaces. Attempts to remedy this situation by the application of extreme pressure often result in blowing the grease fitting from the body of the bearing to which it is attached. Grease guns provided with caps adapted to receive the fitting are often used, but there is a tendency for the caps to blow off of the fitting. At the same time, it is difficult, with reasonable expense, to provide a device which will develop the extreme pressure necessary to "break" the hardened grease or dirt in the bearing, channels or in the orifice of the fitting.

It accordingly becomes an object of this invention to provide a means for supplying lubricant at high pressure to a fitting without endangering the fitting.

It is another object of this invention to provide a means for generating a very high pressure in the lubricant injected into a fitting without the use of hose or conduit leading to the fitting.

It is a further object of this invention to provide means for the addition of lubricant to a bearing following the generation of high pressure to start the flow of lubricant.

Other objects and advantages will become apparent as the description of the illustrated form of this invention proceeds.

Referring now to the drawing:

Figure 1 shows one form of the present invention in use on a grease fitting attached to a bearing forming part of the running gear of an automobile.

Figure 2 is a perspective view of the device of Figure 1 alone.

Figure 3 is a view, partly in section, of the device of Figure 2, the section being taken on line III—III of Figure 2, shown attached to a fitting.

Figure 4 is a section of the fitting-engaging portion of the device of Figure 2.

The embodiment illustrated is adapted for attachment to spring shackles, knuckle bearings, and other common parts of the running gear of automobiles, involving generally a pin and associated irregular bodies pivoting with respect to each other about the pin. It has been illustrated as attached to part of the steering mechanism, but its utility in connection with other organizations is apparent. It should also be apparent that the general shape of the device illustrated can be altered to adapt it to other situations than those mentioned.

In this form, a U-shaped clamp having a relatively long body portion 1, comprised of a pair of spaced members 1¹ and 1¹¹, is provided with arms 2 and 3 set at an angle to the body portion 1. Arm 2 is formed to engage and securely hold the bearing, shackle, or other machine part to which the fitting to be lubricated is attached. To this end, dogs 4 may be provided in arm 2, so they may hook over any convenient projection in the body to which the fitting is attached, or actually engage the machine part, and prevent the device from slipping off during use. At the same time, a cut-out portion 5 in arm 2 prevents the arm from engaging a fitting which is quite often present on either end of a pin in structures such as those shown. These fittings are not intended to stand any mechanical strain, and in Figure 3, it will be noted that a lubricating fitting projects through the opening 5 referred to, thus avoiding stress upon the lubricating fitting to the right in the figure.

The opposite arm 3 carries a member 6, adjustable thereon. This adjustment may be in any desired manner, perhaps the simplest being that illustrated, the provision of threads on member 6 and a corresponding threaded bore on the arm 3, so that rotation of the member 6 will produce axial adjustment of member 6 with respect to the arm 3. The U-shaped clamp and member 6 form together a clamp which may be secured over a fitting by screwing member 6 tightly over the fitting while the arm 2 engages the shackle or bearing to which the fitting is attached.

The form of fitting illustrated in the drawing, particularly in Figure 4, consists of a hexagonal nut A, which is used to hold the assembled bearing together, provided with a wall portion B, covering the threaded bore of the nut on the outer side. Through this wall portion B extends a nipple C, which, in conventional practice, is grasped by the lubricating attachment, the lubricating attachment containing mechanisms to hold the nipple C in sealing engagement with itself. As the wall portion B is very often of sheet material, merely pressed in place in a groove in the nut A, or engaging the threads of the bore, it can be readily seen that extreme pressure within the space behind the wall portion B could very easily blow it out of position.

To obviate this tendency, the end of member 6 is formed with a conical bore 7 for engaging over the nipple C, in sealing relation. A connecting bore 8 leads to conical bore 7, whereby grease or lubricant may be introduced through the orifice in nipple C. It can be seen that screwing member 6 tightly against the nipple C will tend to prevent the nipple and wall B from being displaced by pressure of lubricant behind the wall B.

As the conical bore 7 in member 6 is comparatively unyielding, worn spots on the end of nipple C would permit leakage of lubricating fluid at the joint between the conical bore 7 and the end of nipple C. To obviate this, a cap 9, consisting of a nut 10, threadedly engaging the exterior threads of member 6 may be provided. On the side of nut 10 which is presented to the fitting, the nut may be provided with suitable packing means 11, riveted or otherwise secured in position. The provision of such a cap, adjustably mounted on member 6 enables the creation of a seal between the nut A of the fitting and the cap 9. With the cap 9 in place, any extreme pressure causing leakage between bore 7 and the nipple C will cause the generation of pressure within the space enclosed by cap 9, and such pressure will result in holding the nipple C and wall B in position, tending to balance the pressure within the space behind wall B. The cap 9 therefore performs a dual function of preventing leakage and holding the fitting in place.

For the supply of lubricant to the bore 8 of the member 6, a connector 12, communicating with the bore 8 may be provided. This connector is preferably of the type involving a ball, or other check valve for preventing outward flow, for reasons which will later appear. If grease or lubricant be supplied at high pressure to connector 12, it will be forced through bore 8 and into the bearing through the orifice in nipple C.

As the pressure which can be generated by a conventional grease gun or other lubricating device is often insufficient to cause initial flow of lubricant into the fitting, a piston or plunger is provided in the present invention to aid in the creation of high momentary pressures for forcing lubricant into the fitting and bearing. In the illustrated form, a piston or plunger and cylinder assembly is provided, by boring member 6 to form a cylinder, and having the cylinder bore communicate directly with bore 8 of the member. A suitable piston or plunger operates in the cylinder, and a portion 13 of the piston or plunger extends from the end of the member, in order that it may be struck with a hammer.

If the device as above described be attached to a fitting, and tightly clamped by rotating member 6, grease under high pressure can be supplied to the connector 12 without fear of displacing the fitting, or of leakage between member 6 and the fitting. If, however, the pressure delivered by the grease gun to the connector 12 is insufficient to force grease through the fitting, channels and bearing, the protruding end of the piston may be struck a blow to drive the piston inwardly, the operation being repeated as often as is necessary to cause grease to flow under pressure from the gun itself. The check valve in connector 12 prevents the increase in pressure generated by the movement of the plunger from causing the grease or lubricant to flow back into the gun, rather than into the bearing. Although the displacement of the piston may be quite small, the pressure of the lubricant flowing through the connector will keep the plunger in its outermost position, so that, in the event that lubricant can be forced into the bearing only under pressure generated by striking the piston, it may be repeatedly struck until sufficient lubricant is delivered to the bearing, and without endangering the fitting.

It is to be understood that the description of the form shown is intended to be illustrative of the invention, and not limitative, and that the scope of the invention is best understood from the appended claims.

I claim:

1. A lubricating device for use with high pressure grease fittings of the nipple type comprising a U-shaped clamping stirrup, one of the arms of said U-shaped stirrup being adapted to engage the body to which a fitting is attached, a member threadedly and movably mounted on the other of said arms, said member being provided with a bore, a conical nipple receiving portion leading to said bore, a sealing and retaining element adjustably carried by said member and contacting the portion of the fitting surrounding said nipple, and a connector carried by said member and in communication with said bore, said connector being provided with means preventing flow of lubricant from said bore through said connector whereby grease under pressure may be introduced into said bore and into a nipple held by said member and clamping stirrup.

2. A lubricating device for use with high pressure grease fittings of the nipple type comprising a U-shaped clamping stirrup, one of the arms of said U-shaped stirrup being adapted to engage the body to which a fitting is attached, a member threadedly and movably mounted on the other of said arms, said member being provided with a bore, a conical nipple receiving portion leading to said bore, a cylinder in said member in communication with said bore, and a plunger axially disposed with respect to the cylinder and extending beyond said member, whereby grease within said bore may be forcibly ejected therefrom into a nipple seated in said nipple-receiving portion by actuating said plunger.

3. A lubricating device for use with high pressure grease fittings of the nipple type comprising a U-shaped clamping stirrup, one of the arms of said U-shaped stirrup being adapted to engage the body to which a fitting is attached, a member threadedly and movably mounted on the other of said arms, said member being provided with a bore, a conical nipple receiving portion leading to said bore, a cylinder in said member in communication with said bore, a plunger axially disposed with respect to the cylinder and extending beyond said member, and a connector carried by said member and in communication with said bore, for injection of grease into a nipple seated in said nipple-receiving portion.

4. A lubricating device for use with high pressure grease fittings of the nipple type comprising a member provided with a bore therein, clamping means engaging the body to which a fitting is attached, a conical nipple-receiving portion leading to said bore, a cylinder in said member in communication with said bore, a plunger axially disposed with respect to the cylinder and extending beyond said member, a connector carried by said member and in communication with said bore.

5. A lubricating device for use with high pressure grease fittings of the nipple type comprising a member provided with a bore therein, clamping means engaging the body to which a fitting is attached, a conical nipple-receiving portion leading to said bore, a cylinder in said member in communication with said bore, a plunger in said cylinder axially disposed with respect thereto and extending beyond said member, a connector carried by said member and in communication with said bore, said connector being provided with means preventing flow of lubricant from said bore through said connector.

6. A lubricating device for use with high pressure grease fittings of the nipple type comprising: a U-shaped clamping stirrup, one of the arms of said stirrup being adapted to engage the body to which a fitting is attached, an externally threaded member mounted on the other of said arms and directed toward the first of said arms, said member having a grease receiving bore therein, a conical seat formed in one end of said member and adapted to receive a nipple fitting attached to equipment being lubricated, said conical seat communicating with said bore and a connector fixedly attached to the member and movable therewith, said connector being in communication with said bore and provided with means preventing flow of lubricant from said bore through said connector.

7. A lubricating device for use with high pressure grease fittings of the nipple type comprising: a U-shaped clamping stirrup, one of the arms of said stirrup being adapted to engage the body to which a fitting is attached, an externally threaded member mounted on the other of said arms and directed toward the first of said arms, said member having a grease receiving bore therein, a conical seat formed in one end of said member and adapted to receive a nipple fitting attached to equipment being lubricated, said conical seat communicating with said bore, a connector fixedly attached to the member and movable therewith, said connector being in communication with said bore and provided with means preventing flow of lubricant from said bore through said connector and a sealing and retaining element adjustably carried by the member and adapted to extend beyond the conical seat.

8. A lubricating device for use with high pressure grease fittings of the nipple type including: a member having a grease-receiving conduit therein, a nipple-receiving seat in communication with the conduit formed in said member, clamping means engaging the body to which a fitting is attached and holding said seat in sealing engagement with the nipple of a fitting, a sealing and retaining element adjustably carried by said member and contacting the portion of the fitting surrounding said nipple, whereby to form a seal against the escape of lubricant and prevent the pressure in back of the fitting from forcing the fitting from position.

HARPER LINDSAY DENNIS.